(12) United States Patent
Zhang et al.

(10) Patent No.: US 8,515,419 B2
(45) Date of Patent: Aug. 20, 2013

(54) METHOD, SYSTEM AND DEVICE FOR IMPLEMENTING INTER-NETWORK SHORT MESSAGE SERVICE INTERCOMMUNICATION IN NUMBER PORTABILITY SERVICE

(75) Inventors: Daoping Zhang, Shenzhen (CN); Wei Wang, Shenzhen (CN); Gang Hu, Shenzhen (CN); Xinfeng Cui, Shenzhen (CN); Lei Sun, Shenzhen (CN)

(73) Assignee: ZTE Corporation, Shenzheng, Guangdong Province (CN)

( * ) Notice: Subject to any disclaimer, the term of this patent is extended or adjusted under 35 U.S.C. 154(b) by 0 days.

(21) Appl. No.: 13/386,411

(22) PCT Filed: Mar. 26, 2010

(86) PCT No.: PCT/CN2010/071359
§ 371 (c)(1),
(2), (4) Date: Jan. 21, 2012

(87) PCT Pub. No.: WO2011/022967
PCT Pub. Date: Mar. 3, 2011

(65) Prior Publication Data
US 2012/0149326 A1   Jun. 14, 2012

(30) Foreign Application Priority Data
Aug. 31, 2009   (CN) .......................... 2009 1 0171826

(51) Int. Cl.
*H04W 4/00*   (2009.01)
(52) U.S. Cl.
USPC ..... 455/432.1; 455/466; 455/445; 455/432.2; 455/432.3; 455/435.1; 370/329; 370/331

(58) Field of Classification Search
USPC .................. 455/466, 445, 432.1–432.3, 433, 455/435.1, 436; 370/329, 331
See application file for complete search history.

(56) References Cited

U.S. PATENT DOCUMENTS

2008/0171544 A1* 7/2008 Li et al. ...................... 455/432.1
2009/0227276 A1* 9/2009 Agarwal et al. ............... 455/466
(Continued)

FOREIGN PATENT DOCUMENTS

CN   101009871 A   8/2007
CN   101282503 A   10/2008
(Continued)

OTHER PUBLICATIONS

International Search Report for PCT/CN2010/071359 dated Jun. 10, 2010.

*Primary Examiner* — Wayne Cai
(74) *Attorney, Agent, or Firm* — Stephen Yang; Ling Wu; Ling and Yang Intellectual Property

(57) ABSTRACT

A method and system for implementing inter-network SMS interworking in NP service are provided in the present invention. The method includes: before initiating a MT-SMS, if a first SMS Center of GSM network (G1-SMSC) judges that the destination user is not a user of local network, then it delivers a SRI message to an interworking SMSC; the interworking SMSC queries the NPDB in CDMA network for the home network of the destination MDN, and if the home network is a second GSM network, the interworking SMSC sends a SRI message carrying the destination MDN to the HLR in the second GSM network (G2-HLR); and G2-HLR sends a SRI response carrying the address information of the MSC where the destination user is located to G1-SMSC, and the G1-SMSC initiates a MT-SMS to the MSC where the destination user is located according to the address information.

9 Claims, 7 Drawing Sheets

(56) References Cited

U.S. PATENT DOCUMENTS

2010/0009701 A1* 1/2010 Cai et al. .................. 455/466
2010/0128685 A1* 5/2010 Jiang ........................ 370/329

FOREIGN PATENT DOCUMENTS

CN 101453731 A 6/2009
CN 101651933 A 2/2010

* cited by examiner

METHOD, SYSTEM AND DEVICE FOR IMPLEMENTING INTER-NETWORK SHORT MESSAGE SERVICE INTERCOMMUNICATION IN NUMBER PORTABILITY SERVICE

TECHNICAL FIELD

The present invention relates to communication field, and especially, to a method, system and device for implementing inter-network Short Message Service (SMS) interworking in Number Portability (NP) service.

BACKGROUND OF THE RELATED ART

With the development of the present mobile communication technologies, it is common that operators respectively construct their own mobile networks in one country or region, and even operate mobile communication services by using different standards of mobile networks, thus inter-network (including inter networks with same standard and inter networks with different standards) SMS interworking has become a key aspect in SMS service.

For the severe competition among operators with the 3G ($3^{rd}$-Generation) mobile communication technologies coming, NP service, as a means to restrict monopoly, protect small and medium-sized operators, and guarantee better development of mobile communication technologies, has become a mobile communication service which must be implemented in regulations of more and more countries.

The NP service is usually divided into three types: Location Portability, Service Portability and Service Provider Portability. The present invention discusses the Service Provider Portability, which is commonly referred as the service of shifting network with the number. The service of shifting network with the number means that a user's service is provided by the network which the user newly subscribes to without changing the original number, and the user can enjoy the same supplementary services and value-added services as the other users in the newly subscribed network, where these services are not affected by the original network.

In order to realize the SMS service with the function of NP, the inter-network interworking is the key problem for implementing this service. For the implementation of interworking of inter-network SMS with the function of NP service, there are currently at least three categories of methods:

First category: the location of a mobile terminated short message service (MT-SMS) is obtained through MAP-SEND-ROUTING-INFO-FOR-SM message (shorten as SRI message below), and inter-network communication is limited within the same type of network. This category of methods are mainly implemented in a plurality of GSM MAP (Global System for Mobile Communications Mobile Application Part) based networks (in the mainstream three standards of 3G, the core networks of TD-SCDMA (Time Division-Synchronous Code Division Multiple Access) and WCDMA (Wideband Code Division Multiple Access) are based on GSM MAP, shorten as GSM network below). But the communication between GSM networks and ANSI-41 (American National Standards Institute) based networks (e.g. the core network of CDMA2000 network is based on ANSI-41, shorten as CDMA networks below) is not easy to be realized by this category of method.

Patent application CN200810114269.7 is an example that is implemented by this category of method.

According to the characteristics of GSM MAP, this category of method sets the rule that the short message service center (SMSC) returns optional parameter, e.g. IMSI (International Mobile Subscriber Identity), after obtaining the routing from HLR (Home Location Register). The NP service only maintains ISDN (Integrated Services Digital Network) number, while IMSI number is provided by the new operator, thus the network for MT-SMS can be judged according to the segment of the IMSI number returned by the HLR. But the response to the SRI message in ANSI-41 based CDMA core network usually returns the optional parameter MIN (Mobile Identification Number), only a few networks that support protocol IS751 ream IMSI. Therefore adopting this category of method for CDMA networks to judge the destination network is not appropriate. Since the MAP parts in GSM network and CDMA network are quite different, this category of method can not achieve the interworking between a GSM network and a CDMA network.

Second category: searching the information of the home network of the destination number (e.g. NP query) is realized through a network gateway at signaling side, and messages are delivered through the gateway. Patent application CN200710090453.8 is an example.

The concept of Routing Number (RN) is introduced in this category of method, which separates the procedures of NP query and routing query (home MSC (Mobile Switching Center) query) and unifies GSM and CDMA procedures, thus facilitating the processing in the SMS gateway. In this case, NP query and inter-network interworking are achieved through the gateway, which increase cost and network load for network reforming. Meanwhile the MT-SMS is performed by being forwarded to SMSC in the destination network, so the source SMSC does not know if the message has been sent successfully or not in the end, thus the final charging accuracy can not be guaranteed.

Third category; the destination number query (e.g. NP query) and routing query are realized through SMPP (Short Message Peer to Peer) gateway, and messages are delivered through the SMPP gateway.

As for the implementation, the third category of method is similar to the second category. The only difference is that the gateway is arranged at SMPP side instead of the signaling side, and if SMSC judges that the destination number is not from the local network, it delivers messages to SMPP gateway for processing, and then SMPP gateway queries NPDB (Number Portability Database) to obtain the home network of the destination number, and directly delivers the messages to SMSC in home network for processing. This category of method is the easiest realization, but the shortcoming is the same as the second category of method, which is that inter-network charging statistics is not guaranteed.

In view of the above, the main technical problems of inter-network SMS interworking in NP function to be solved are as below:

1, the means of home network query;
2. the means of inter-network SMS delivery;
3. the means of inter-network charging.

Only if these problems are well settled, the scheme of inter-network interworking can be economical and practical, and also meet the network requirements.

SUMMARY OF THE INVENTION

The present invention provides a method, system and device for implementing inter-network Short Message Service (SMS) interworking in Number Portability (NP) service, which realizes the inter-network SMS interworking in NP service with an effective and feasible procedure.

In order to solve the above problems, a method for implementing inter-network SMS interworking in NP service is provided in the present invention, comprising:

Before initiating a terminating call, if a first SMSC of GSM network (G1-SMSC) judges that a destination user is not a user of local network, it delivers a SRI message which carries a destination mobile directory number (MDN) to an interworking SMSC, wherein the interworking SMSC is a reformed CDMA SMSC by setting a signaling processing module to GSM networks and CDMA networks in the CDMA SMSC and by loading a processing logic for NP service and interworking service;

the interworking SMSC queries a number portability data base (NPDB) in CDMA network for a home network of the destination MDN; if the home network is a second GSM network, the interworking SMSC sends a SRI message which carries the destination MDN to a home location register in a second GSM network (G2-HLR), wherein a source address in the message is an address of G1-SMSC;

the G2-HLR sends an SRI response to G1-SMSC, wherein the response carries the address information of the MSC where the destination user is located; based on the address information, G1-SMSC originates a mobile terminated short message service (MT-SMS) to the MSC where the destination user is located.

This method further has the following features:

The step of the interworking SMSC querying the NPDB for the home network of the destination MDN comprises: querying to obtain the Routing Number (RN) of the home network of the destination MDN;

the interworking SMSC records the corresponding relationship between the RN and the destination MDN after performing the query to obtain the RN of the home network of the destination MDN;

the method further comprises: if the delivery of the MT-SMS fails, the G1-SMSC delivers are RDS request message carrying the destination MDN to the interworking SMSC; according to the corresponding relationship between RN and destination MDN locally recorded, the interworking SMSC obtains the RN of a second GSM network after receiving the RDS request message, and originates an RDS request message of which the source address is the address information of G1-SMSC to G2-HLR; after receiving the RDS request message, G2-HLR returns a RDS response to the G1-SMSC.

This method further has the following features:

the interworking SMSC is further configured to process the destination address of signaling connection control part (SCCP) layer in the SRI message sent to G2-HLR to be a form of $RN_{G2}$ corresponding to the second GSM network+destination MDN, wherein the $RN_{G2}$ denotes the RN of the second GSM network.

The present invention also provides a method for implementing inter-network SMS interworking in NP service, comprising:

before initiating an MT-SMS, if the GSM SMSC (G-SMSC) judges that the destination user is not a user of local network, it delivers a SRI message which carries a destination number to an interworking SMSC, wherein the interworking SMSC is a reformed CDMA SMSC by setting a signaling processing module to GSM networks and CDMA networks in the CDMA SMSC and by loading a processing logic for NP service and interworking service;

when the interworking SMSC queries NPDB in CDMA network for the home network of the destination MDN and the home network is a CDMA network, the interworking SMSC sends a SRI to the HLR in the CDMA network; after receiving the response to the SRI, the interworking SMSC saves the corresponding relationship between the destination number and the address, carried in the response, of the C-MSC in the home network of the destination number, and returns the SRI response to the G-SMSC, wherein the source address in the response is the address of the interworking SMSC in the GSM network;

the G-SMSC delivers the MT-SMS carrying the destination number to the interworking SMSC; according to the stored corresponding relationship between the destination number and the address of C-MSC, the interworking SMSC converts the MT-SMS into an MT-SMS of a CDMA network and delivers it to C-MSC corresponding to the destination number, and converts a MT-SMS response returned by C-MSC into a MT-SMS response of a GSM network and delivers it to G-SMSC.

The method further has the following features:

The interworking SMSC not only saves the corresponding relationships between the destination numbers and the C-MSC addresses, but also saves the corresponding relationships between the destination numbers and the home networks of the destination numbers;

The method also comprises:

if the delivery of the MT-SMS fails, the G-SMSC sends a RDS request message carrying the destination number to the interworking SMSC; after receiving the RDS request message, the interworking SMSC knows that the destination number belongs to a CDMA network according to the corresponding relationship stored locally between the destination number and the home network of the destination number, and then inserts the destination number and the G-SMSC address into the Message Waiting Data (MWD) table;

When receiving a notification message of recovery of the destination phone status sent by C-MSC, according to the destination number carried in the notification message, the interworking SMSC searches the MWD table and obtains the G-SMSC address corresponding to the destination number, and then sends a notification to G-SMSC, and deletes the destination number and the G1-SMSC address from the MWD table; after receiving the notification, G-SMSC regenerates the MT-SMS procedure.

The present invention also provides a method for implementing inter-network SMS interworking in NP service, comprising:

After receiving the Short Message Delivery Point-to-Point (SMDPP) mobile originated request sent from an SMSC (C-MSC) in a CDMA network, the interworking SMSC queries the Number Portability Data Base (NPDB) in the CDMA network for the home network of the destination number according to the destination number carried in the SMDPP mobile originated request; if the home network is a GSM network, the interworking SMSC sends a SRI request carrying the destination number to the HLR in the GSM network (G-HLR); after receiving the SRI response returned by G-HLR, the interworking SMSC originates the MT-SMS to the G-MSC corresponding to the address according to the G-MSC address, carried in the response, of the home network of the destination number; wherein the interworking SMSC is a reformed CDMA SMSC by setting a signaling processing module to GSM networks and CDMA networks in the CDMA SMSC and by loading a processing logic for NP service and interworking service.

The method further comprises the following steps:

If the delivery of the MT-SMS fails the inter working SMSC sends an RDS request carrying the destination number to G-HLR;

the G-HLR, sends a RDS response to the interworking SMSC, wherein the response carries the SMSC address, obtained by searching the destination number, of network to which the destination number belongs;

after receiving the notification message sent by G-SMSC, indicating the recovery of the destination phone status in the GSM network, the interworking SMSC performs message retry and re-originates the MT-SMS to the SMSC in the network to which the destination number belongs; and responds a notification response message to G-HLR.

The present invention also provides a system for implementing inter-network SMS interworking in NP service, comprising: a SMSC in a first GSM network (G1-SMSC), a NP data base (NPDB) of a CDMA network, an HLR of a second GSM network (G2-HLR) and an interworking SMSC;

the G1-SMSC is configured to: when judging a destination user is not a user of local network, deliver a SRI message carrying a destination MON to the interworking SMSC; after receiving a SRI response, originate a MT-SMS to MSC where the destination user is located according to address information of the MSC, where the destination user is located, carried in the SRI response;

The interworking SMSC is configured to: query the NPDB for the home network of the destination MDN according to the destination MDN, and when judging that the home network is the second GSM network, send a SRI message carrying the destination MDN to the G2-HLR, where the source address of the SRI message is the address of G1-SMSC;

the NPDB is configured to provide service of the home network of the destination MDN for the interworking SMSC;

the G2-HLR is configured to send a SRI response, carrying the address information of the MSC where the destination user is located, to the G1-SMSC after receiving the SRI message.

The system further comprises the following features:

The configuration that the NPDB is configured to provide service of the home network of the destination MDN for the interworking SMSC refers to: the NPDB configured to return the Routing Number (RN) of the home network of the destination MDN to the interworking SMSC according to the destination MDN sent by the interworking SMSC;

the interworking SMSC is also configured to record the corresponding relationship between the RN and the destination MDN after obtaining the RN of the home network of the destination MDN;

the G1-SMSC is also configured to deliver a RDS request message carrying the destination MDN to the interworking SMSC when the delivery of the MT-SMS fails;

the interworking SMSC is also configured to: after receiving the RDS request, according to the corresponding relationship recorded locally between the RN and the destination MDN, obtain the RN of the second GSM network, and originate a RDS request message to the G2-HLR, where the source address in the RDS request message is the address information of G1-SMSC;

G2-HLR is also configured to return a RDS response to the G1-SMSC after receiving the RDS request message.

The system further has the following features:

The interworking SMSC is also configured to process the destination address of SCCP layer in the SRI message which is sent to G2-HLR to be a form of $RN_{G2}$ corresponding to the second GSM network+destination MDN, wherein $RN_{G2}$ denotes the RN of the second GSM network.

The present invention also provides a system for implementing inter-network SMS interworking in NP service, comprising: a SMSC in a GSM network (G-SMSC), a NP data has (NPDB) in a CDMA network, a FUR in a CDMA network (C-HLR) and an interworking SMSC;

the G-SMSC is configured to: when judging that the destination user is not a user of local network before the delivery of the MT-SMS, deliver a SRI message carrying the destination number to the interworking SMSC; also deliver the MT-SMS carrying the destination number to the interworking SMSC; and receive the MT-SMS response returned by the interworking SMSC;

the interworking SMSC is configured to query the NPDB for the home network of the destination number, and if judging that the home network is a CDMA network, convert the SRI message into a Send-Routing-Info request of a CDMA network and deliver it to the C-HLR; further configured to after receiving the Send-Routing-Info response, save the corresponding relationship between the destination number and the C-MSC address, which is carded in the response, of the SMSC in the network to which the destination number belongs, and convert the Send-Routing-Info response into an SRI response then return to G-SMSC, wherein the source address in the SRI response is the address of the interworking SMSC in the GSM network; further configured to, according to the locally stored corresponding relationship between the destination number and the C-MSC address, convert the MT-SMS into an MT-SMS of the CDMA network and deliver it to the C-MSC corresponding to the destination number after receiving the MT-SMS, and after receiving a MT-SMS response returned by C-MSC, convert the response into a MT-SMS response of a GSM network and deliver it to G-SMSC;

the NPDB is configured to provide service of the home network of the destination number for the interworking SMSC;

the is configured to after receiving the Send-Routing-Info request, search and obtain the address information of C-MSC according to the destination number carried in the request, and return the address information to the interworking SMSC by Send-Routing-Info response.

The system further has the following features:

The interworking SMSC is also configured to save the corresponding relationship between the destination number and the home network of the destination number;

the G-SMSC is also configured to deliver a RDS request message carrying the destination MDN to the interworking SMSC when the delivery of the MT-SMS fails; and restart the MT-SMS procedure after receiving the notification message sent by the interworking SMSC;

the interworking SMSC is also configured to: after knowing that the destination number belongs to a CDMA network according to the corresponding relationship locally stored between the destination number and the home network after receiving the RDS request message, insert the destination number and the G-SMSC address into the Message Waiting Data (MWD) table; and when receiving the notification message of recovery of the destination phone status sent by C-MSC, search the MWD table and obtain the G-SMSC address corresponding to the destination number according to the destination number carried in the notification message, and then send the notification message to G-SMSC, and delete the destination number and G-SMSC address from the MWD table;

the C-MSC is configured to send a notification message to the interworking SMSC after the destination phone recovers the status.

The present invention also provides a system for implementing inter-network SMS interworking in NP service, comprising: a SMSC in a GSM network (G-SMSC), a NP data base (NPDB) in a CDMA network, a HLR in a GSM network (G-HLR), a SMSC in a CDMA network (C-MSC) and an interworking SMSC;

the C-MSC is configured to send a SMDPP mobile originated request carrying the destination number to the interworking SMSC;

the interworking SMSC is configured to, after receiving the SMDPP mobile originated request, query NPDB for the home network of the destination number according to the destination number carried in the SMDPP; and when judging that the home network is a GSM network, send a Send-Routing-info request carrying the destination number to the G-HLR; and after receiving the Send-Routing-Info response returned by G-HLR, generate the MT-SMS to the G-MSC corresponding to the address according to the G-MSC address, which is carried in the response, of the SMSC of the home network of the destination number;

the NPDB is configured to provide service of the home network of the destination MDN for the interworking SMSC;

the G-HLR is configured to, after receiving the Send-Routing-Info request, search and obtain the address information of G-MSC according to the destination number carried in the request, and return the address information to the interworking SMSC by the Send-Routing-Info response.

The system has the following features:

The interworking SMSC is also configured to send a RDS request carrying the destination number to the G-HLR after the delivery of the MT-SMS fails; and after receiving the notification message indicating the recovery of the destination phone status in the GSM network sent by G-SMSC, perform message retry and re-originate the MT-SMS to the SMSC in the network to which the destination number belongs, and reply a notification response message to the G-HLR;

the G-HLR is also configured to send a RDS response to the interworking SMSC and receive the notification response message; wherein the RDS response carries the SMSC address, obtained according to the destination number, of the network the destination number belongs to.

The present invention also provides an interworking SMSC for implementing inter-network SMS interworking in NP service, comprising a service processing module, a G-MAP signaling processing module and a C-MAP signaling processing module;

the service processing module is configured to realize triggering for each service logic, wherein the service logic include the processing logic for NP service and for interworking service;

the G-MAP signaling processing module and C-MAP signaling processing module are configured to convert the signaling between GSM and CDMA networks in the interworking SMSC;

The interworking SMSC may also comprise a charging processing module;

the charging processing module connects with the service processing module, and is configured to generate accounting bills according to the obtained service processing information.

The beneficial effects of the present invention are described as follows:

1. The designed model is advantageous to the development of SMSC in a CDMA network—in the view of the situation of most domestic and international areas, the CDMA network is still at an inferior position compared with GSM network, while the CDMA network has its own advantages on the evolution cost and complexity in the course of evolution to 3G (at least in the early stage), therefore many newly born operators and traditional operators in the world usually adopt CDMA scheme for a new network. Thus, for those operators which are at an inferior position and also possibly newly born, in these circumstances the realization of the interworking with the original networks is required to be considered. This design in the present invention is based on the SMSC in a CDMA network, which does not need to add new network elements and simplifies networking;

2. Cost in network reforming is low—if the whole network only uses the SMSC in the CDMA network to query NPDB, then as for the SMSC in a G network, in the case that the callee is not a user of local network, the SRI message is delivered to the C network for processing, thus the G network nearly does not need any change. The NPDB for query NP information can be supplied with only one interface for the SMSC in the CDMA network to query. In this way the number of network elements required to be reformed is limited for operators, and complexity is reduced and the cost as well;

3. The procedure implementation is simple, and the network load is low—due to the reasons that fewer network elements are involved in the full interworking network; and for mobile originated network, the procedure is basically similar to the usual procedure for inner network mobile terminated, only in some of parts of the procedures the signaling conversion is performed, also the SMSC in the C network integrates the function of GC (Gateway Controller) and signaling gateway, thus the procedure is clear and simple, and the increase in the network load is relatively weak;

4. High reliability of inter-network message delivery—in the case of failure of mobile terminated short message, resending or triggering mechanism guarantees the messages do not act lost to meet the requirement of the protocols, so the messages can be resent in time, thus better guaranteeing reliability of internetwork message delivery;

5. Accurate and real-time statistics and charging—the SMSC considers all the procedures as a direct mobile terminated short message, which can obtain the status of the mobile terminated short message accurately and in real time, therefore guaranteeing accurate and real-time statistics and charging.

PREFERRED EMBODIMENTS OF THE PRESENT INVENTION

Figure 1:
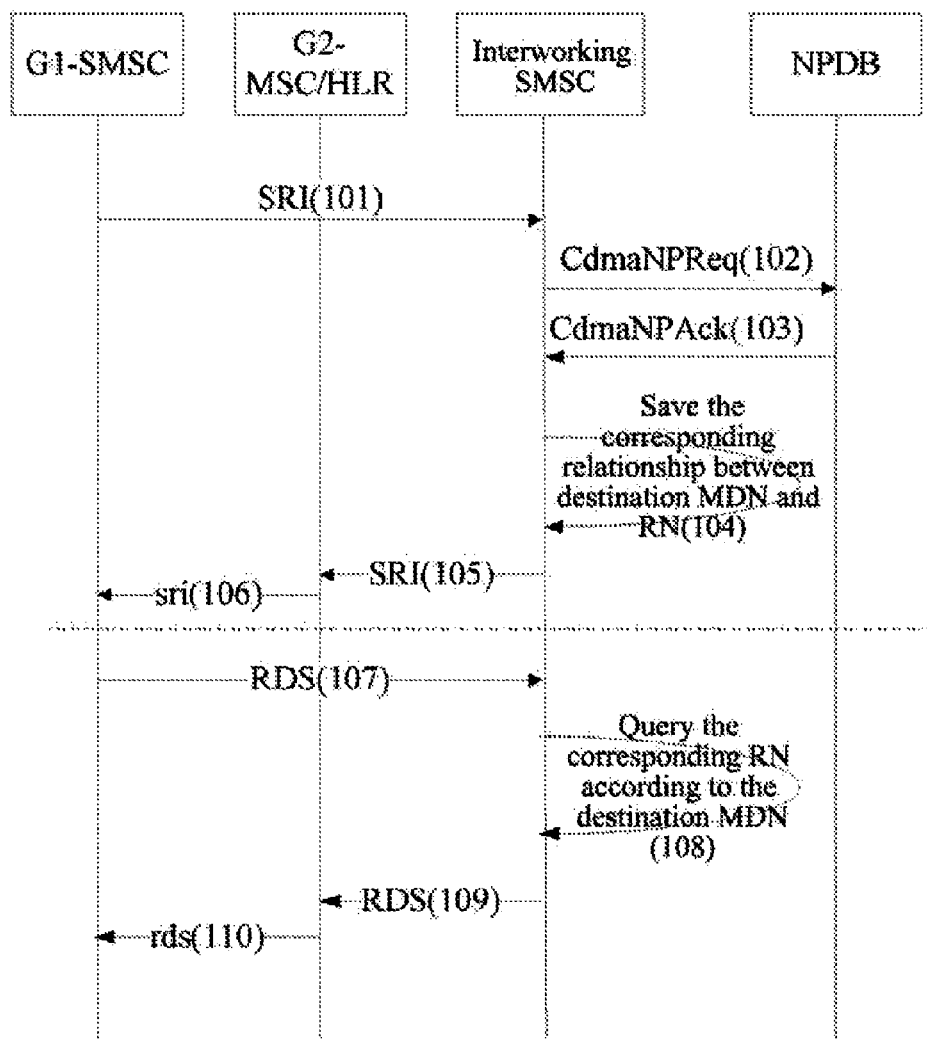
FIG. 1 is a flow diagram of SMS interworking between a user in G1 network and a user in G2 network according to the embodiment of the present invention.

According to the figures and embodiments, the detailed description of the technical scheme in the present invention is discussed below.

Comparing the core network signaling of GSM with that of CDMA, the main differences which require the signaling processing module to carry out processing accordingly are showed in the table below.

A storage database is added in the interworking SMSC to record the following related in formation:

RN-MDN (Mobile Directory Number) corresponding relationship table it records the corresponding relationship between MDN and RN which has been searched in NPDB in order to skip the NPDB searching process in the subsequent procedures;

MWD (Message Waiting Data) table—sometimes the interworking SMSC functions as the HLR of a GSM network, therefore the MWD table is required to be configured to record the destination MDN and the address of the SMSC in the GSM network which initiates the originating message in order to facilitate the processing of the subsequent notification message procedures;

| Protocol | GSM | CDMA |
|---|---|---|
| MTP (Media Transfer Protocol), SCCP (Signaling Connection Control Part) | No difference | |
| TCAP (Transaction Capabilities Application Part) | ITU (International Telegraph Union) - TCAP Complex conversation, comprising three portions: Component, Dialog and Transaction. Message tags use the Application-wide Class. | ANSI-TCAP Relatively simple conversation, comprising two portions: Component and Transaction, and the Transaction portion is very simple; message tags use the Private Use Class. |
| MAP | GSM 09.02 comprises MAP Provider and MAP User, and defines primitives, operations and procedures. Provider is equivalent to our TM process, and MAP users are equivalent to our MAP process. The interactions between MAP user and MAP Provider involve procedures such as Open, Req, Rsp, Close, Delimiter, Abort, Error etc., which is very complicated. Applying Application Context, Version number etc. to update protocol requires the high version compatible with the lower version, though the implementation of the high version is relatively complex, | IS 41D does not carry out differentiation clearly. The interactions between MAP User and the bottom layers are easy, only involving Req and Rsp. Adding fields for extending protocol (such as 841 extends 41D) facilitates the realization and there are less influence on the updating and extension of protocol. No conceptions of the Application Context and the Version number. |
| Service Layer | GSM 03.40 Simple encoding and decoding, fixed format (similar to SMPP, one parameter following another), few parameters, very concise | IS637 Format as a form of TLV (Tag Length-Value). Many parameters, though most of them are not often used. |

The differences between TCAP and MAP mainly exist in the procedures and signaling structure. The key part of the realization of the present invention will be discussed in detail when analyzing the specific procedures.

The differences of service layer mainly exist in the data structure and coding, which can be realized by adding changes of data structure in the short message and, as for the coding aspect, carrying out conversion of coding and decoding between GSM 03.38, 03.40 and CDMA IS637, TSB-58F. This is not depicted specifically in the present invention.

The present invention takes one CDMA SMSC as the reformed entity, in which a signaling gateway is configured. The reform of NP service and interworking service procedures introduced is performed in this CDMA SMSC so as to reduce the reforming cost and difficulties. This CDMA SMSC is called the interworking SMSC below for the reason of easier describing.

RN-Network Type table—after querying to obtain RN, the method for handing SRI message needs to be determined, whether directly forwarding or converting into the SMSReq message of CDMA network for processing;

MDN-MIN corresponding relationship table—it may be stored in the user information table.

Procedure design of SMSC with NP service:

The present invention considers two GSM networks and one CDMA network as the model to describe that the interworking mechanism is realized by the method. This model is the most common and easier to be depicted. Even if more networks are extended, the procedures are less affected.

Suppose the two GSM networks are respectively represented as G1 and G2, the CDMA network is represented as C1. In this case inter-network SMS interworking procedures may be G1→G2, G1→C and C→G1.

According to the mobile originated SMS, inter-network SMS interworking procedures can be described as two types:

mobile originated SMS of GSM network and mobile originated SMS of CDMA network.

The detailed realization of inter-network interworking procedures is described below. Since the processing in the SMSC of the GSM network nearly does not change, the description of the procedures mainly focuses on the realization of the interworking SMSC.

G1→G2 Procedure

FIG. 1 shows the detailed procedure, comprising the following steps:

(101) During delivering a mobile terminated SMS, the SMSC in the G1 network (G1-SMSC) sends a SRI message carrying the destination MDN and GT (Global Title) information to the interworking SMSC after judging that the destination user belongs to an external network;

(102) The interworking SMSC sends a NP query message CdmaNPReq carrying the above destination MDN to NPDB;

(103) After receiving CdmaNPReq, the NPDB queries and obtains the RN of the network the destination user belongs to (it is the RN of G2 network in this procedure) based on the destination MDN, and returns the RN through NP query response message CdmaNPAck to the interworking SMSC;

(104) If the interworking SMSC searches, according to the NP query response message returned by the NPDB, the destination user in this procedure belongs to G2 in the corresponding relationship table between RN and Network Type locally stored, then saves the corresponding relationship between the destination MDN and the searched-out RN;

(105) The interworking SMSC sends a SRI message to the HLR in G2 network (G2-HLR), where the source address of SCCP layer in this SRI message is the GT information of G1-SMSC (to guarantee that G2-HLR can directly return the SRI Response sri to G1-SMSC), and the destination address of the SCCP layer is a form of RN corresponding to G2 network+destination MDN;

(106) After receiving the SRI message, G2-HLR returns the original SRI response sri carrying the address information of G2-MSC to G1-SMSC; for the reason that the destination user belongs to a G network, which does not require the protocol conversion for the MT-SMS, after receiving the sri, G2-SMSC can directly originate the mobile terminated SMS to G2 network according to the address of G2-MSC carried in the response message. This process is similar to the processing of interworking procedure commonly used between G network and G network.

(107) If the mobile terminated SMS fails (here the failure corresponds to a specific failure code, the corresponding failure cases such as phone powered off/full storage), G1-SMSC sends a RDS (Ready Deliver Short Message) request message RDS to the interworking SMSC, wherein the RDS carries the MDN of the destination user;

(108) The interworking SMSC obtains the RN of G2 network according to the corresponding relationship between MDN and RN stored therein;

(109) The interworking SMSC sends a RDS request message RDS to G2-HLR, where the source address of SCCP layer in the RDS message is the GT information of G1-SMSC, and the destination address of the SCCP layer is a form of N corresponding to G2 network+destination MDN;

(110) G2-HLR returns the original RDS response rds to G1-SMSC.

Subsequently, when the status of the destination user becomes normal, G2-HLR will directly send a notification message to G1-SMSC based on the recorded GT information of G1-SMSC, and then deliver the original message, thus guaranteeing integrity and reliability of the message handling procedure.

Furthermore, the description of this procedure is as follows:

a. The NP query interface is implemented according to IS-756 protocol, and other means of the NP interface may be used for the NP query;

b. The simplest way in the interworking SMSC to deliver the SRI message is using each RN to point to the STPs (Signaling Transfer Points) in different networks;

c. The mobile terminated SMS in G1 network usually firstly sends the SMS to the STP between G1 and G2, and then the STP forwards the signaling. For the reason that the network elements in SS7 network commonly use STP connection, especially when G1 and G2 belong to different operators, therefore the STP is required to forward messages on SCCP layer;

d. The interworking SMSC queries NP and forwards the SRI message in this procedure, and if necessary, it may also provide bills for this procedure and charge G1 network.

Figure 2:
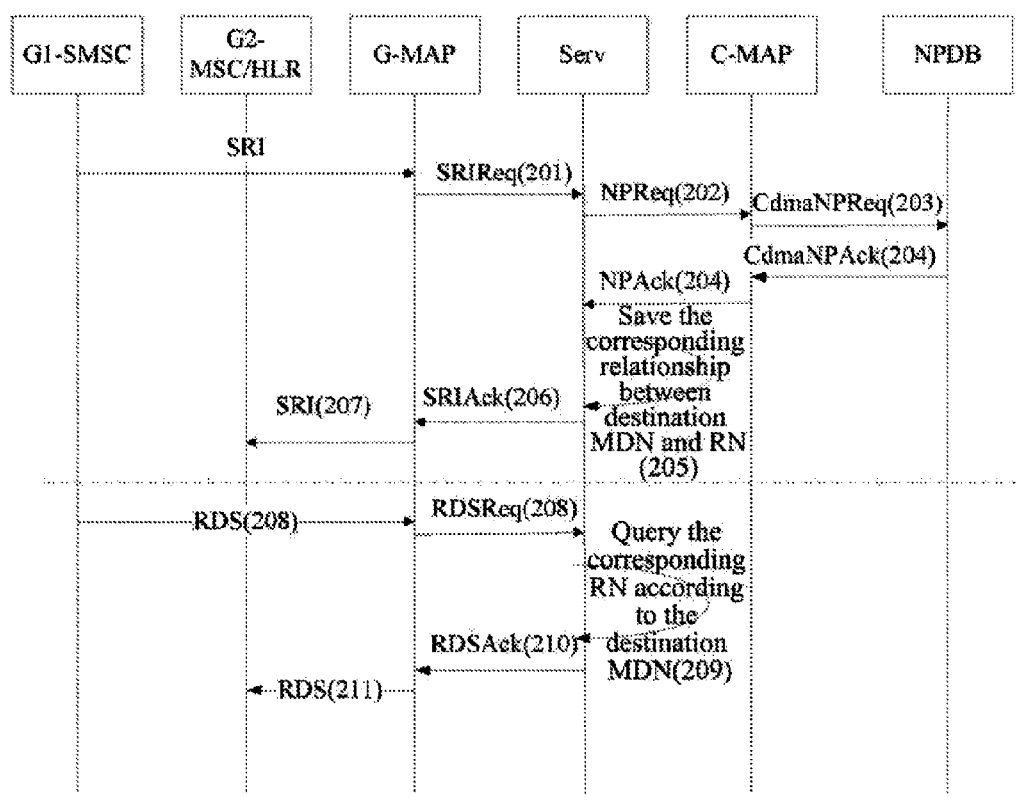
FIG. 2 is a flow diagram performed within the interworking SMSC for SMS interworking between a user in G1 network and a user in G2 network according to the embodiment of the present invention.

Furthermore, the reformed interworking SMSC is composed of three parts: a G-MAP signaling processing module, a service processing module and a C-MAP signaling processing module. FIG. 2 shows the internal handling procedure in the interworking SMSC; comprising the following steps:

(201) After receiving the SRI message sent by G1-SMSC; the G-MAP signaling processing module sends an internal message SRIReq carrying the destination MDN and GT information to the service processing module;

(202) According to whether or not the RN information is contained in the GT, the service processing module judges whether or not to send a NP request; if the RN information is not contained in the GT, proceeding to the next step, otherwise proceeding to step (205);

(203) The service processing module sends an internal NP query message NPReq to the C-MAP signaling processing module, and the C-MAP signaling processing module sends a NP query message CdmaNPReq to an external NPDB;

(204) The C-MAP signaling processing module converts the external signaling CdmaNPack returned by the NPDB into an internal message NPAck and delivers it to the service processing module;

(205) If the service processing module judges, based on the destination RN carried in the NPAck; the destination user in the current procedure belongs to G2, it saves the corresponding relationship between the destination MDN and the searched-out RN;

(206) The service processing module returns an internal message SRIAck to the G-MAP signaling processing module, where SRIAck carries the searched-out RN and sets the replacement flag bit;

(207) Based on the received SRIAck, the G-MAP signaling processing module sends a new GSM MAP message SRI message to G2-HLR, where the source address of SCCP layer in the message is the GT information of G1-SMSC, the destination address of the SCCP layer is a form of the RN corresponding to G2 network+MDN, and the MSC address of G2 network where the destination user is located is carried in the TP layer;

If the delivery of the MT-SMS fails, the internal processing procedure the interworking SMSC also comprises the following steps:

(208) After receiving the RDS message sent by G1-SMSC, the G-MAP signaling processing module sends the converted internal message RDSReq carrying the destination MDN to the service processing module;

(209) The service processing module obtains the RN of G2 network based on the corresponding relationship between the destination MDN and RN stored therein;

(210) The service processing module returns an internal response message RDSAck to the G-MAP signaling processing module, wherein SRIAck carries the RN of G2 network and sets the replacement flag bit;

(211) Based on the received RDSAck, the G-MAP signaling processing module sends a new GSM MAP message RDS message to G2-HLR, where the source address of SCCP layer in the message is the GT information of G1-SMSC; the destination address of the SCCP layer is a form of the RN corresponding to G2 network+MDN, and the MSC address of G2 network where the destination user is located is carried in the TP layer.

The corresponding system comprises: a SMSC in a first GSM network (G1-SMSC), a NPDB in a CDMA network, a HLR in a second GSM network (G2-HLR) and an interworking SMSC;

The G1-SMSC is used to deliver a SRI message carrying the destination number to the interworking SMSC when judging the destination user is not a user of local network; it is also used to, after receiving a SRI response, originate a mobile terminated SMS to the MSC where the destination user is located according to the address information of the MSC where the destination user is located carried in the SRI response;

The interworking SMSC is used to query the NPDB for the home network of the destination number based on the destination number, and when judging that the home network is the second GSM network, send a SRI message carrying the destination number to the G2-HLR, wherein the source address in the SRI message is the address of G1-SMSC;

the NPDB is used to provide service of the home network of the destination number for the interworking SMSC;

the G2-HLR is used to send a SRI response carrying the address information of the MSC where the destination user is located to the G1-SMSC after receiving the SRI message.

G1→C Procedure

Figure 3:
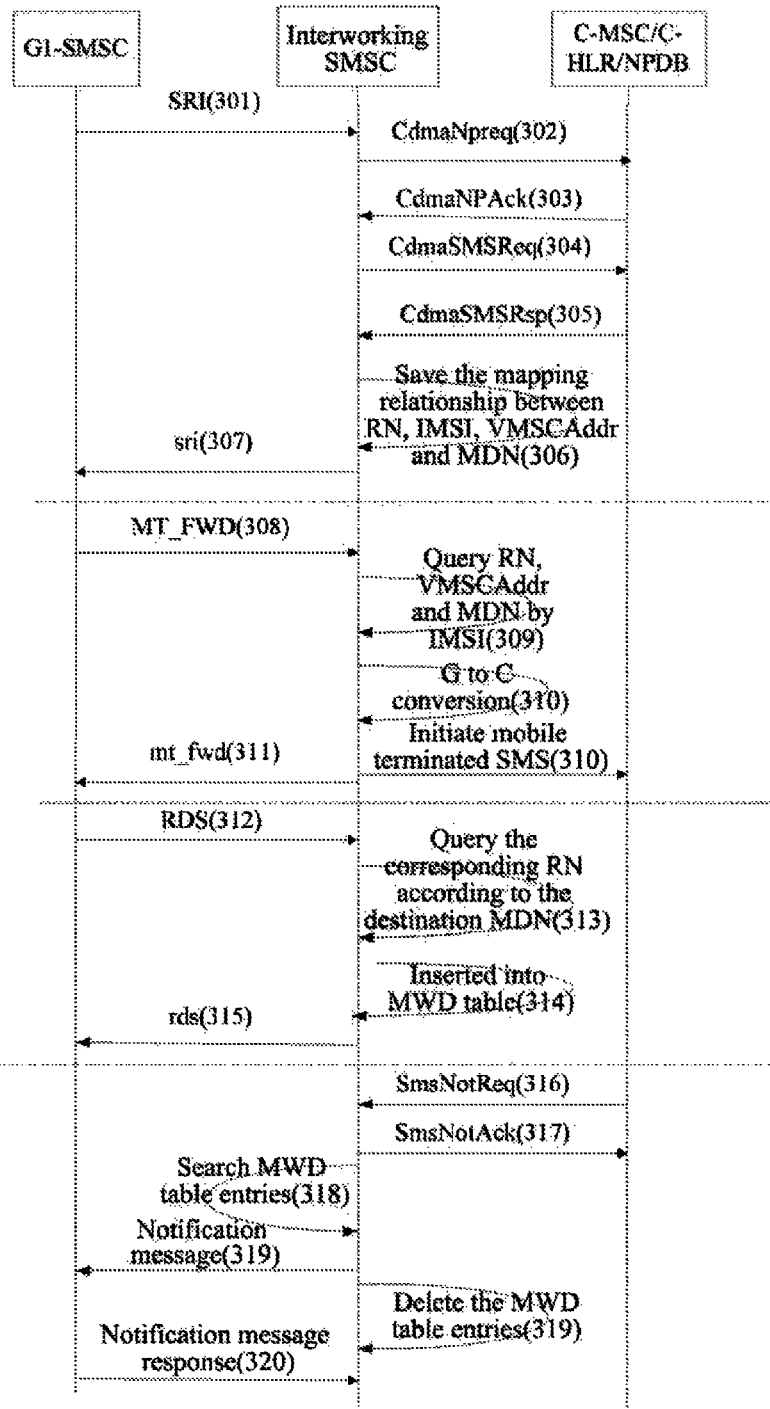
FIG. 3 is a flow diagram of SMS interworking between a user in G1 network and a user in C network according to the embodiment of the present invention.

FIG. 3 shows the detailed procedure, comprising the following steps:

(301) During delivering the MT-SMS, the SMSC in G1 network (G1-SMSC) sends a SRI message carrying the destination MDN and the GT information to the interworking SMSC after judging the destination user belongs to an external network; (the GT information maybe contains the RN of the local network, which means the NPDB has been queried in G1 network)

(302) The interworking SMSC sends NP query message CdmaNPReq carrying the above destination MDN to the NPDB; (if the GT does not contain the RN of the local network, proceeding with this step, otherwise skipping step 302/303, directly considering the destination number belongs to the C network, thus reducing NPDB queries and saving network resources due to the more flexible judgment process)

(303) After receiving CdmaNPReq, the NPDB queries and obtains the RN of the network the destination user belongs to based on the destination MDN, and then returns the RN through NP query response message CdmaNPAck to the interworking SMSC; the interworking SMSC finds the destination user in this procedure belongs to the C network in the corresponding relationship table between RN and Network Type locally stored;

(304) The interworking SMSC sends a Send-Routing-Info query signaling CdmaSMSReq carrying the MDN (or MIN/IMSI) of the destination user to C-HLR;

(305) C-HLR replies a Send-Routing-Info query response CdmaSMSRsp to the interworking SMSC, where the response carries VMSCAddr (visit Mobile Services Switching Center Address) of the network the destination user belongs to and MSID (or IMSI/MIN);

(306) The interworking SMSC locally stores the corresponding relationship of RN/IMSI/VMSCAddr/MDN obtained through NP query and the Send-Routing-Info query;

(307) The interworking SMSC returns a SRI response message sri carrying IMSI parameter to G1-SMSC, and fills VMSCAddr with the address information of the interworking SMSC in the GSM network;

(308) G1-SMSC delivers MT_FWD message carrying IMSI of the destination user to the interworking SMSC;

(309) The interworking SMSC obtains MDN, RN and VMSCAddr of the destination user by searching locally through the destination IMSI;

(310) The interworking SMSC converts the content of TP layer in the MT_FWD from the format of G network to the format of C network, and then initiates a mobile terminated SMS to the C-MSC of which the address in the C network is VMSCAddr;

(311) After receiving the response of the mobile terminated SMS, convert the response to a response message mt-fwd in the format of G network then send it to G1-SMSC;

(312) If the delivery of the MT-SMS fails, G1-SMSC sends a RDS request message RDS carrying the MDN of the destination user to the interworking SMSC;

(313) The interworking SMSC queries and obtains the RN of the destination user in the C network according to the corresponding relationship between MDN and RN stored therein;

(314) The interworking SMSC inserts the destination MDN and address information of G1-SMSC into the MWD table;

(315) The interworking SMSC returns the original RDS response rds to G1-SMSC;

(316) When the status of the destination phone recovers, C-MSC sends a notification message SmsNotReq carrying the destination MDN to the interworking SMSC;

(317) After receiving the notification message, the interworking SMSC replies a response SmsNotAck to C-MSC;

(318) According to the MDN in the notification message, the interworking SMSC searches MDW table and obtains the address information of G1-SMSC;

(319) The interworking SMSC, based on the obtained address information of G1-SMSC, sends a notification message MAP-ALERT-SERVICE-CENTRE service (Alert_sc for short) to G1-SMSC for notifying G1-SMSC that the destination user has recovered; furthermore, the interworking SMSC deletes the table entries corresponding to the MDN in the MDW table;

(320) G-SMSC replies a notification message response alert_sc to the interworking SMSC, and then performs mobile terminated SMS attempts according to the notification message, and the whole process starts from step 301 until the delivery of the MT-SMS succeeds.

Furthermore, the description of this procedure is as follows:

a. the former half of this procedure is the same as that of the procedure of G1→G2, and the subsequent processing is unusual which makes the key technical part of the present invention;

b. this procedure can also handle the processing flow from G1 network side to an ESME (External Short Message Entity) in a C network, in which case, the procedure is roughly similar to the Point to Point procedure, though the NP query and routing query are not needed, and the MT-SMS of the G network is directly converted into Deliver_sm_req message of SMPP for processing;

c. as for the case that the C network may trigger the error code for the notification message again, it is required to be inserted into the MWD table, so that after the notification message is delivered to the interworking SMSC, the interworking SMSC can forward it to G1-SMSC, thus guaranteeing integrity and reliability of the messaging procedure.

Figure 4:
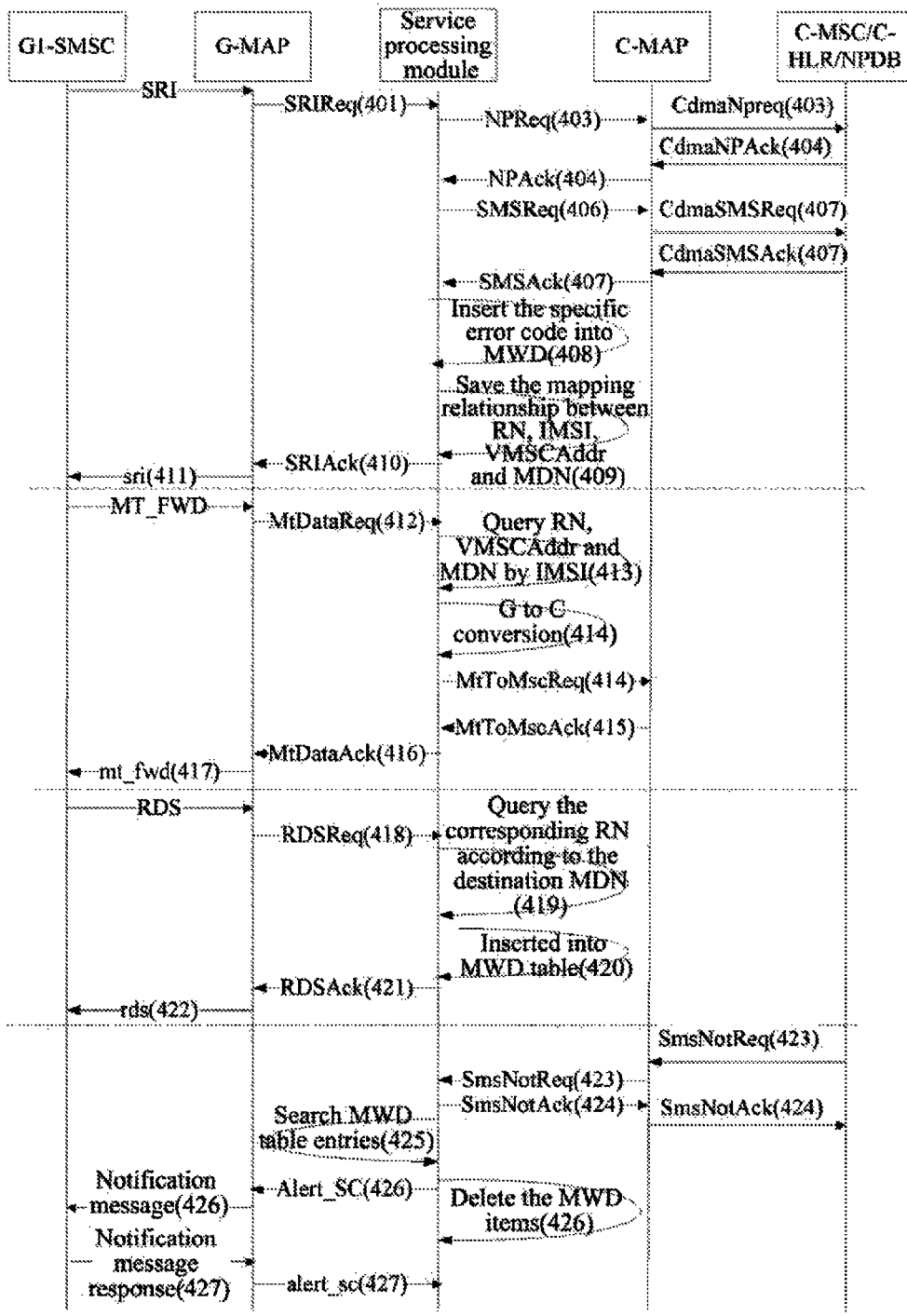
FIG. 4 is an internal flow diagram performed in the interworking SMSC for SMS interworking between a user in G1 network and a user in C network according to the embodiment of the present invention.

Furthermore, in this procedure the internal processing flow in the interworking SMSC is showed in FIG. 4, comprising the following steps:

(401) After receiving the SRI message sent by G1-SMSC, the G-MAP signaling processing module initiates an internal message SRIReq carrying the destination MDN and GT information to the service processing module;

(402) According to whether or not the RN information is contained in the GT, the service processing module judges whether or not to initiate a NP request; if the RN information is not contained in the GT, proceeding to the next step, otherwise proceeding to step (405);

(403) The service processing module sends an internal NP query message NPReq to the C-MAP signaling processing module, and the C-MAP signaling processing module sends an NP query message CdmaNPReq to an external NPDB;

(404) The C-MAP signaling processing module converts the external signaling CdmaNPAck returned by the NPDB into an internal message NPAck and delivers it to the service processing module;

(405) The service processing module determines, based on the RN carried in the NPAck, that the destination user in the current procedure belongs to a C network;

(406) The service processing module performs protocol conversion on the received SRIReq message into SMSReq and sends it to the C-MAP signaling processing module;

(407) The C-MAP signaling processing module converts the SMSReq message into an ANSI-MAP Send-Routing-Info query signaling CdmaSMSReq and forwards it to C-HLR; and, after receiving the Send-Routing-Info query response CdmaSMSAck carrying VMSCAddr and MSID (IMSI/MIN) returned by C-HLR, the C-MAP signaling processing module converts the response message into an internal message SMSAck and delivers it to the service processing module;

(408) If the Send-Routing-Info query response message SMSAck returns a specific error code, the error of User Not Reachable returned by C-HLR is required to be inserted into the MWD table in the interworking SMSC, which is equivalent to setting the MNRF (Mobile Station Not Reachable Flag); and then the service processing module performs the inserting processing on the MWD table, where the MWD table is a memory table designed in the present system similar to HLR, which shares the same function as the HLR in a G network (see protocol GSM 0902);

(409) Whether the routing is successfully obtained or not, the service processing module locally stores the corresponding relationship of RN/IMSI/VMSCAddr/MDN obtained through the NP query and SMSReq query in the local memory table;

(410) The service processing module performs protocol conversion on the response message SMSAck into SRIAck and then returns it to the G-MAP signaling processing module; where SRIAck carries IMSI parameters and fills VMSCAddr with the address information of the interworking SMSC in the GSM network;

If the Send-Routing-Info response message returned by C-HLR does not support protocol IS751, the optional parameters usually includes the user's MIN number, and the G network requires returning the optional parameter of IMSI. At the present stage, it is generally believed that IMSI is composed of MCC+MNC+MIN. Therefore during the conversion from SMSAck message into SRIAck message, it would be appropriate to add the conversion processing on MIN into IMSI, thus the corresponding relationship between each RN and MCC/MNC is required to be added in the configuration information.

(411) After convening the internal message SRIAck into an external signaling sri, the G-MAP signaling processing module sends it to G1-SMSC;

(412) After receiving the mobile terminated message MT_FWD carrying the destination IMSI sent by G1-SMSC, the G-MAP signaling processing module converts it into an internal message MtDataReq and then sends MtDataReq to the service processing module;

(413) The service processing module searches locally and obtains MDN, RN and VMSCAddr of the destination user based on the destination IMSI carried in MtDataReq;

(414) The service processing module converts MtDataReq into a C network message MtToMscReq through protocol conversion, and delivers it to the C-MAP signaling processing module after modifying the address of the mobile terminated MSC in the message as the destination VMSCAddr searched and obtained in step 413;

(415) The C-MAP signaling processing module converts MtToMscReq into an external message and delivers it to the MSC in the C network; and when receiving the mobile terminated response, converts the response into an internal message MtToMscAck and returns it to the service processing module;

(416) The service processing module converts MtToMscAck into a G network message MtDataAck through protocol conversion, and returns it to the G-MAP signaling processing module;

(417) The G-MAP signaling processing module converts the response message into a response mt_fwd to the Mobile Terminated message MT_FWD and sends it to G1-SMSC.

If the delivery of the MT-SMS fails, the internal processing procedure in the interworking SMSC also comprises the following steps:

(418) After receiving the RDS message sent by G1-SMSC, the G-MAP signaling processing module sends the converted internal message RDSReq carrying the destination MDN to the service processing module;

(419) The service processing module obtains the RN of the C network based on the corresponding relationship between the destination MDN and RN stored therein;

(420) The service processing module inserts the destination MDN and the address information of G1-SMSC into the MWD table;

(421) The service processing module returns an internal response message RDSAck to the 6-MAP signaling processing module;

(422) The 6-MAP signaling processing module returns the original RDS response rds to G1-SMSC;

(423) When receiving the notification message SmsNotReq sent by C-MSC after the status of the destination phone recovers, the C-MAP signaling processing module sends the message carrying the destination MDN to the service processing module;

(424) The service processing module sends the response SmsNotReq to C-MSC through the C-MAP signaling processing module;

(425) The service processing module searches the MDW table stored locally according to the destination MDN carried in the notification message and obtains the address information of G1-SMSC;

(426) The service processing module, according to the obtained address of G1-SMSC, sends a notification message Alert_Sc through the G-MAP signaling processing module to G1-SMSC so as to notify G1-SMSC that the destination user has recovered; and deletes the table entry from the MWD table;

(427) After receiving the response alert_sc to the notification message replied by G1-SMSC, the G-MAP signaling processing module converts this response into an internal message alert_sc and sends it to the service processing module.

The corresponding system comprises a SMSC in a GSM network (G-SMSC), a NPDB in a CDMA network, a HLR in the CDMA network (C-HLR) and an interworking SMSC;

the G-SMSC is used to deliver a SRI message canting the destination number to the interworking SMSC when judging the destination user is not a user of local network; it is also used to deliver the MT-SMS carrying the destination number to the interworking SMSC; further used to receive the MT-SMS response returned by the interworking SMSC;

the interworking SMSC is used to query the NPDB for the home network of the destination number, and when judging that the home network is a CDMA network, convert the SRI message into a Send-Routing-Info request of a CDMA network and deliver it to the C-HLR; it is also used to, after receiving the Send-Routing-Info response, save the corresponding relationship between the destination number and the address, which is carried in the response, of the C-MSC in the network to which the destination user belongs, and convert the Send-Routing-Info response into the SRI response then return to the G-SMSC, wherein the source address in the SRI response is the address of the interworking SMSC in the GSM network; further used to, according to the locally stored corresponding relationship between the destination number and the address of C-MSC, convert the MT-SMS into a MT-SMS of the CDMA network and deliver it to the corresponding C-MSC after receiving the MT-SMS, and after receiving the MT-SMS response returned by C-MSC, convert the response into a MT-SMS response of a GSM network and deliver it to G-SMSC;

the NPDB is used to provide service of the home network of the destination number for the interworking SMSC;

the C-HLR is used to, after receiving the Send-Routing-Info request, search and obtain the address information of C-MSC according to the destination number carried in the request, and return it to the interworking SMSC through the Send-Routing-Info response.

C-G1 Procedure

Figure 5:
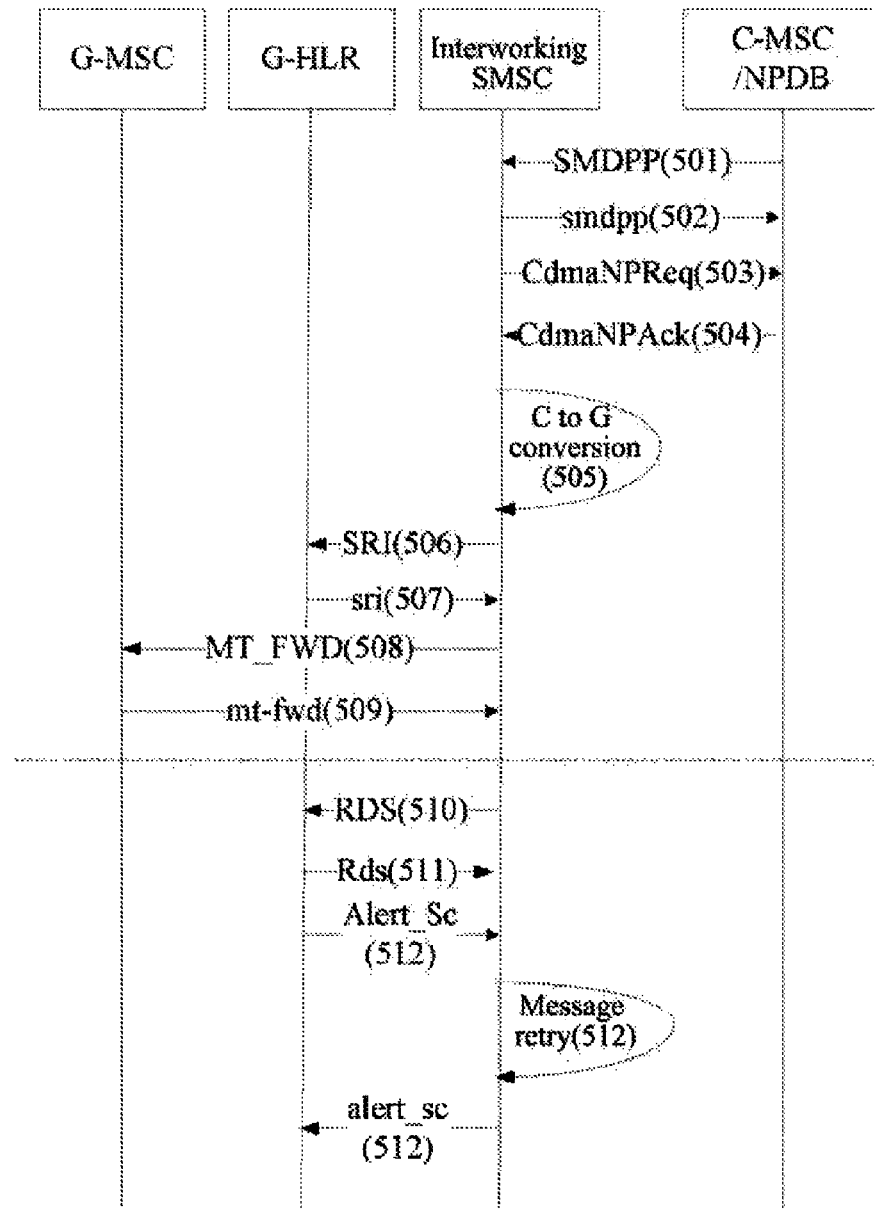
FIG. 5 is a flow diagram of SMS interworking between a user in C network and a user in G network according to the embodiment of the present invention.
Figure 6:
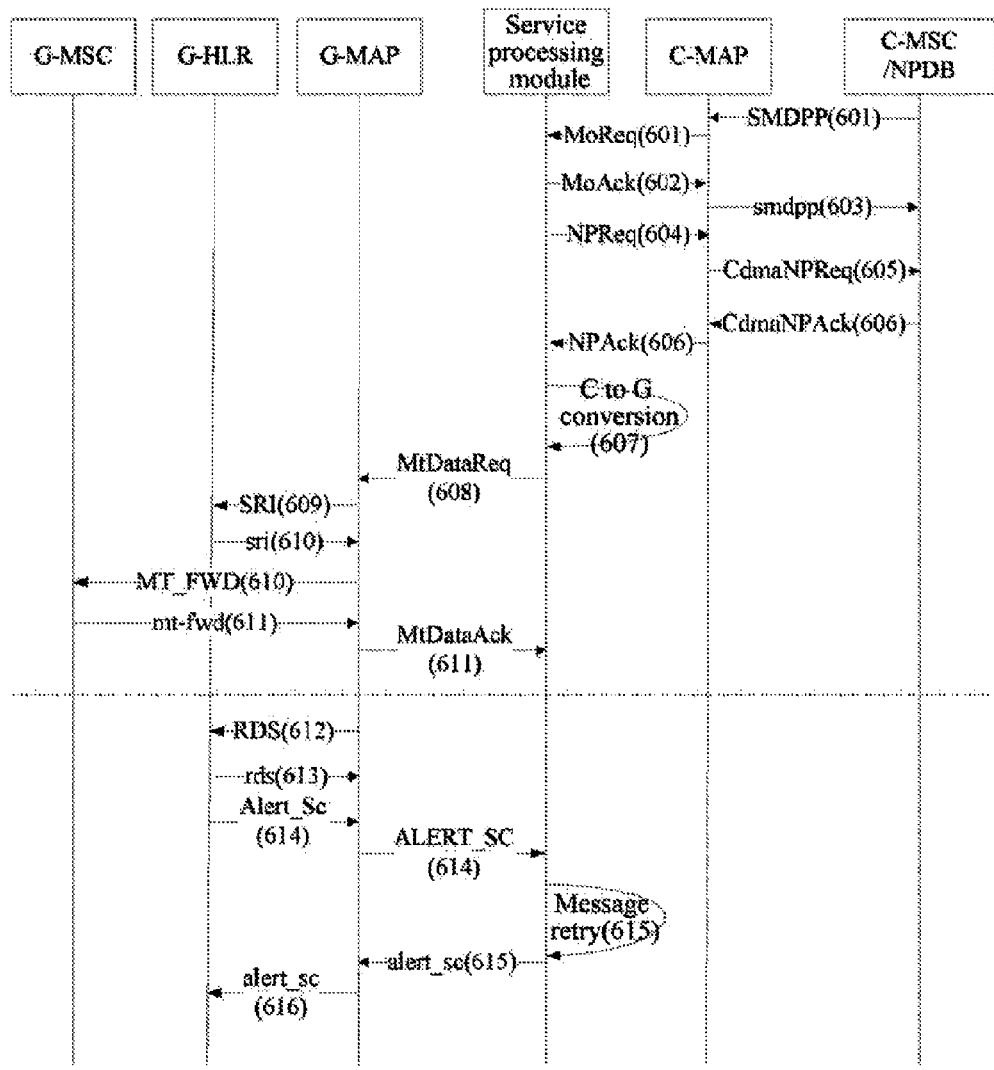
FIG. 6 is an internal flow diagram performed in the interworking SMSC for SMS interworking between a user in C network and a user in G network according to the embodiment of the present invention.

FIG. 5 shows the detailed procedure, comprising the following steps:

(501) the SMSC in the C network (C-MSC) initiates a mobile originated request SMDPP (Short Message Delivery Point-to Point) of C network to the interworking SMSC, where the request carries the MDN of the destination user;

(502) the interworking SMSC replies a response smdpp to C-MSC after receiving the request;

(503) the interworking SMSC queries NPDB with an NP query signaling CdmaNPReq carrying the MDN of the destination user;

(504) NPDB searches locally according to the received MDN, and obtains the corresponding RN and returns it to the interworking SMSC through a message CdmaNPACK;

(505) the interworking SMSC converts the message from C network to G network after judging that the destination user is a user of a G network;

(506) the interworking SMSC initiates a SRI message carrying the MDN of the destination user to G-HLR;

(507) G-HLR replies the response sri carrying the address of the mobile terminated MSC to the interworking SMSC;

(508) according to the address of the mobile terminated MSC, the interworking SMSC initiates a mobile terminated message MT_FWD to G-MSC;

(509) after receiving it, G-MSC sends a mobile terminated response mt_fwd to the interworking SMSC;

(510) if the delivery of the MT-SMS fails, the interworking SMSC sends a RDS carrying the destination MDN to G-HLR;

(511) G-HLR sends the response rds to the interworking SMSC, where the response carries the SMSC address (the G-MSC address), obtained based on the destination MDN, of the network to which the destination MDN belongs;

(512) The interworking SMSC carries out message retry after receiving the notification message Alert_Sc sent by the G-HLR which indicates the recovery of the destination phone status in the G network, and re-performs step 508; and replies a notification response message alert_sc to G-HLR;

Furthermore, in this procedure the internal processing flow in the interworking SMSC is showed in FIG. 6, comprising the following steps:

(601) After receiving the message SMDPP, the C-MAP signaling processing module converts the message into an internal message MoReq and delivers it to the service processing module;

(602) The service processing module performs processing on the internal message and returns an internal response MoAck to the C-MAP signaling processing module;

(603) The C-MAP signaling processing module converts the response into an external message smdpp and returns it to C-MSC;

(604) The service processing module initiates a NP query procedure, and delivers an internal message NPReq to the C-MAP signaling processing module;

(605) The C-MAP signaling processing module initiates an NP query standard signaling to NPDB, and delivers message CdmaNPReq to NPDB;

(606) After receiving the query response CdmaNPAck returned by NPDB, the C-MAP signaling processing module converts the response into an internal message NPAck and delivers it to the service processing module;

(607) The service judges, based on the destination RN carried in the response message, the destination number belongs to a user of G network, and then performs the conversion from C network to G network on the message;

(608) The service processing module sends an internal mobile terminated message MtDataReq to the G-MAP signaling processing module;

(609) After receiving it, the G-MAP signaling processing module originates a Send-Routing-Info request SRI to G-HLR;

(610) The G-MAP signaling processing module, after receiving the Send-Routing-Info response sri, initiates a mobile terminated message MT-FWD to the corresponding G-MSC according to the address, carried in the response, of the SMSC in the G network where the destination user is located;

(611) After receiving the mobile terminated response mt_fwd, the G-MAP signaling processing module converts the response into an internal response MtDataAck and delivers it to the service processing module;

if the delivery of the MT-SMS fails, the internal processing flow in the interworking SMSC further comprises the following steps:

(612) The G-MAP signaling processing module directly originates a RDS procedure to G-HLR;

(613) The G-MAP signaling processing module receives the response rds;

(614) After receiving the notification message Alert_Sc sent by G-HLR which indicates the recovery of the destination phone status in the G network, the G-MAP signaling processing module converts the message into an internal message ALERT-SC and delivers it to the service processing module;

(615) The service processing module carries out message retry, and re-performs step 608; and replies a notification response message alert_sc to the G-MAP signaling processing module;

(616) The G-MAP signaling processing module converts alert_sc into an external response alert_sc and replies it to G-HLR.

Furthermore, the description of this procedure is as follows:

a. In this procedure the interworking SMSC functions fully as an SMSC to store and forward messages. Inter-network message delivery can be realized without the participation of other SMSCs in two networks of mobile originated and mobile terminated;

b. During the stage of mobile originated short message, the interworking SMSC does not make any difference from the usual SMSC of a C network, while during the stage of mobile terminated short message, it plays fully the role as the SMSC of a G network.

The corresponding system comprises a SMSC in a GSM network (G-SMSC), a NPDB in a CDMA network, a HLR in the GSM network (G-HLR), a SMSC in a CDMA network (C-MSC) and an interworking SMSC;

the C-MSC is used to initiate a mobile originated request SMDPP carrying the destination number to the interworking SMSC;

the interworking SMSC is used to, after receiving the SMDPP, query NPDB for the home network of the destination number according to the destination number carried in the SMDPP; and when judging that the home network is a GSM network, send a Send-Routing-Info request carrying the destination number to G-HLR; it is also used to, after receiving the Send-Routing-Info response returned by G-HLR, initiate a mobile terminated SMS to the corresponding G-MSC according to the SMSC (G-MSC) address, which is carried in the response, of the network to which the destination user belongs;

the NPDB is used to provide service of the home network of the destination number for the interworking SMSC;

the G-HLR is used to, after receiving the Send-Routing-Info request, search and obtain the address information of G-MSC according to the destination number carried in the request, and return it to the interworking SMSC through the Send-Routing-Info response.

The present invention realizes the NP procedure by reforming a SMSC of a CDMA network. The following describes the detailed implementations and reforming methods by network elements.

1. The Reform for SMSC in a GSM Network

Figure 7:
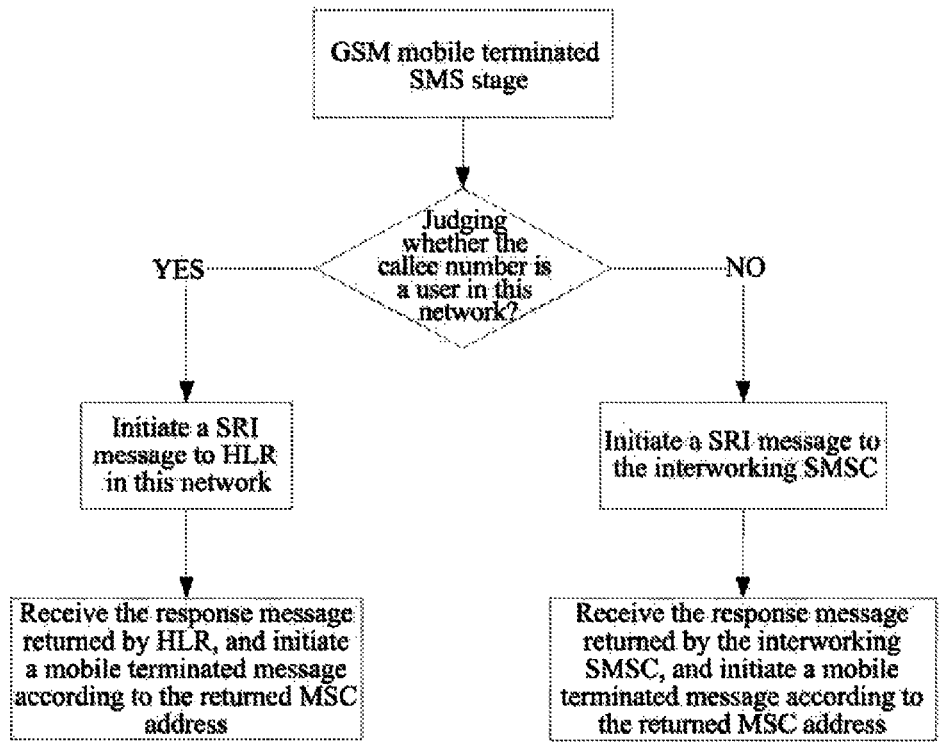
FIG. 7 is a flow diagram of processing after a GSM network originates a MT-SMS according to the embodiment of the present invention.

Whether the destination user is a user of local network is needed to be judged during the mobile terminated SMS in a GSM network. Take G1 network as an example to describe the logic judgment, and the specific procedure is showed in FIG. 7, comprising the following steps:

(701) Before the mobile terminated SMS in G1 network, the SMSC in G1 network firstly judges if the destination user belongs to G1 network, and if yes, perform step 702, otherwise perform step 703;

(702) The SMSC in G1 network follows the original procedure, delivering the SRI message to the HLR in G1 network for processing, then directly initiating the mobile terminated SMS in G1 network;

(703) The SMSC in G1 network delivers the SRI message to the interworking SMSC for processing; the interworking SMSC performs the NP query and obtains the information of the network the destination user belongs to, and then judges the type of the destination network, if the destination network is a GSM network, it directly forwards the SRI message to the HLR in the destination GSM network which returns the response message to the SMSC in the GSM network for processing; if the destination network is a CDMA network, the interworking SMSC carries out signaling conversion, and delivers SMSReq message to the HLR in the CDMA network, and returns the response message to the SMSC in G1 network for processing. At this time, for the SMSC in the GSM network the originating user belongs to, the interworking SMSC is treated as a HLR. In the view of the SMSC in G1 network, the procedure is nearly not different from the original message processing procedure.

Furthermore, description of the above procedure is as follows:

a. As for the signaling of Send-Routing-Info after NP query, the destination number in SCCP layer of the Send-Routing-info signaling may be set as a form of RN+ISDN in order to facilitate the delivery of the Send-Routing-Info message;

b. The interworking SMSC in this procedure only converts and forwards signaling, and any storage processing is not involved.

c. The connection between the interworking SMSC and NPDB may be realized in flexible ways. The mainstream connection means can be applicable by extending interfaces;

d. In the case of a whole network structure with a larger scale, no matter increasing more GSM networks or CDMA networks, only if the NPDB to which the interworking SMSC connects is able to query and obtain the RN, the procedure is also applicable due to the corresponding different RNs in different networks.

As stated above, the judgment whether the added destination user is a user of local network, and the processing whether the message is selected to be delivered to the HLR of local network or to the interworking SMSC are added in the SMSC of the GSM network in this procedure, the other parts do not change as for the procedure in the SMSC of the GSM network.

2. The Reform for SMSC in a CDMA Network

Figure 8:
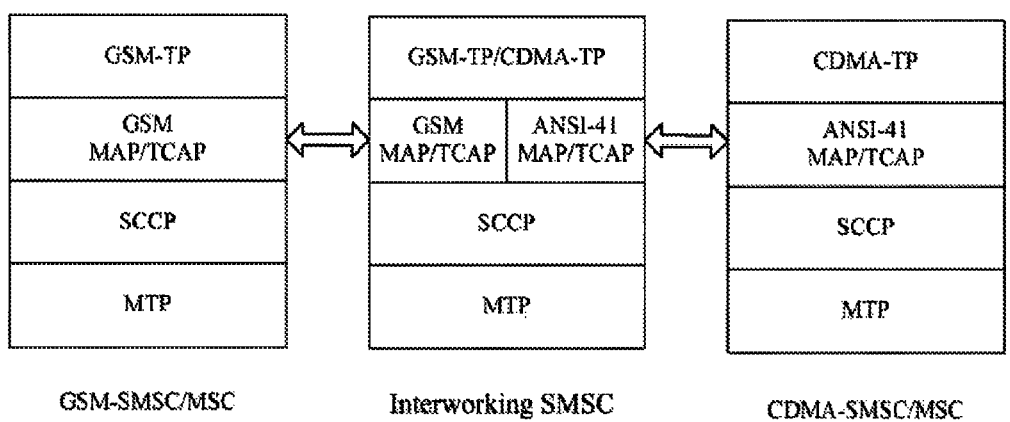
FIG. 8 is a suggested layered communication model diagram of SS7 in the interworking SMSC according to the embodiment of the present invention.

The reform takes the SMSC in a CDMA network as a basis, which is divided logically into several modules, and modules communicate by local network or by internal messages between processes.

service processing module—mainly realizes the trigger for each service logic. It may initiate the traditional CDMA terminated procedure; initiate NPDB query procedure; may also perform the procedure related to inter-network message interworking;

signaling processing module (shorten as signaling gateway)—comprising the G-MAP signaling processing module and C-MAP signaling processing module, used to convert internal messages into SS7 messages and interact with SS7 networks. FIG. 8 shows a suggested layered communication model of SS7. The signaling prior to SCCP layer (TCAP, MAP, TP) of GSM and CDMA are quite different. The key processing in the signaling processing module is to handle the signaling conversion between GSM and CDMA networks;

other interface module—is mainly used to connect with SCP (Service Control Point) or OCS (Online Charging System) for charging in real time; or connect with the interworking gateway on SMPP side for connecting SP (Signaling Point) and other networks;

performance statistic module—obtains the statistic data related to the service connecting with the service processing module;

charging module—obtains service processing information by connecting with the service processing module, thus generating accurate accounting bills such as the inter-network bills.

Certainly, the present invention has many other embodiments. For those skilled in the art, out departing from the spirit and the essence of the invention, they can make various corresponding modifications and variations according to the invention. These corresponding modifications and variation should be included in the protection scope of the appended claims of the invention.

INDUSTRIAL APPLICABILITY

Compared with the prior art, the present invention reduces the cost of network reforming, simplifies the procedure implementation, decreases network load, and improves reliability of inter-network message delivery and statistic and charging accuracy.

What is claimed is:

1. A method for implementing inter-network Short Message Service (SMS) interworking in Number Portability (NP) service, comprising:
   before initiating a mobile terminated short message service (MT-SMS), if a first SMS Center of GSM network (G1-SMSC) judges that a destination user is not a user of local network, delivering a MAP-SEND-ROUTING-INFO-FOR-SM (SRI) message which carries mobile directory number (MDN) of the destination user to an interworking SHORT Message Service Center (SMSC); wherein the interworking SMSC is a reformed Code Division Multiple Access (CDMA) SMSC by setting a signaling processing module to Global System for Mobile Communications (GSM) networks and CDMA networks in CDMA SMSC and by loading a processing logic for NP service and interworking service;
   the interworking SMSC querying Number Portability Data Base (NPDB) in the CDMA network for a home network of destination MDN, and if the home network of destination MDN is a second GSM network, sending a SRI message which carries the destination MDN to a Home Location Register (HLR) in the second GSM network (G2-HLR), wherein a source address in the SRI message is an address of the G1-SMSC; and
   the G2-HLR sending a SRI response to the G1-SMSC, wherein the SRI response carries address information of mobile switching center (MSC) where the destination user is located; based on the address information, the G1-SMSC initiating a MT-SMS to the MSC where the destination user is located;
   or, the method comprising:
   before initiating a MT-SMS, if a SMSC of GSM network (G-SMSC) judges that a destination user is not a user of local network, delivering a SRI message which carries a destination number to an interworking SMSC; wherein the interworking SMSC is a reformed CDMA SMSC by setting a signaling processing module to GSM networks and CDMA networks in CDMA SMSC and by loading a processing logic for NP service and interworking service;
   when the interworking SMSC queries NPDB in the CDMA network and obtains that the destination number belongs to the CDMA network, sending a SRI request to HLR in the CDMA network; after receiving a SRI response, storing a corresponding relationship between the destination number and an address, carried in the SRI response, of a SMSC in a CDMA network (C-MSC) in a home network of the destination number, and returning the SRI response to the G-SMSC, wherein a source address of the SRI response is an address of the interworking SMSC in the GSM network; and
   the G-SMSC delivering the MT-SMS carrying the destination number to the interworking SMSC; according to the stored corresponding relationship between the destination number and the address of C-MSC, the interworking SMSC converting the MT-SMS into a MT-SMS of the CDMA network and delivering to C-MSC corresponding to the destination number, and converting a received MT-SMS response returned by C-MSC into a MT-SMS response of the GSM network and delivering to the G-SMSC;
   or, the method comprising:
   after receiving a Short Message Delivery Point-to-Point (SMDPP) mobile originated request sent from C-MSC in a CDMA network, an interworking SMSC querying Number Portability Data Base (NPDB) in the CDMA network for a home network of destination number according to the destination number carried in the SMDPP mobile originated request; if the home network of destination number is a GSM network, sending a SRI request carrying the destination number to HLR in the GSM network (G-HLR); after receiving a SRI response returned by G-HLR, according to G-MSC address, carried in the SRI response, of the home network of the destination number, the interworking SMSC originating a MT-SMS to G-MSC corresponding to the G-MSC address; and
   wherein the interworking SMSC is a reformed CDMA SMSC by setting a signaling processing module to GSM networks and CDMA networks in the CDMA SMSC and by loading a processing logic for NP service and interworking service.

2. The method according to claim 1, wherein
   the step of querying the NPDB for the home network of the destination MDN comprises: querying and obtaining Routing Number (RN) of the home network of the destination MDN;
   after querying and obtaining the Routing Number (RN) of the home network of the destination MDN, the method further comprises: the interworking SMSC records a corresponding relationship between the RN and the destination MDN;
   the method further comprises: if delivery of the MT-SMS to MSC where the destination user is located fails, the G1-SMSC delivering a RDS request message carrying the destination MDN to the interworking SMSC; according to the corresponding relationship between the RN and the destination MDN locally recorded, the interworking SMSC obtaining the RN of a second GSM network after receiving the RDS request message, and originating a RDS request message of which a source address is address information of the G1-SMSC to the G2-HLR; after receiving the RDS request message, the G2-HLR returning a RDS response to the G1-SMSC.

3. The method according to claim 1, further comprising:
the interworking SMSC processing a destination address of signaling connection control part (SCCP) layer of the SRI message sent to the G2-HLR to be a form of $RN_{G2}$ corresponding to the second GSM network+destination MDN, wherein the $RN_{G2}$ denotes the RN of the second GSM network.

4. The method according to claim 1, wherein in the step of storing the corresponding relationship between the destination number and the address, carried in the SRI response, of C-MSC in the home network of the destination number, the interworking SMSC also stores a corresponding relationship between the destination number and the home network of the destination number;
the method also comprises:
if the G-SMSC delivering the MT-SMS carrying the destination number to the interworking SMSC fails, the G-SMSC sending a Ready Deliver Short Message (RDS) request message carrying the destination number to the interworking SMSC; after receiving the RDS request message, the interworking SMSC obtaining that the destination number belongs to the CDMA network according to the corresponding relationship between the destination number and the home network of the destination number stored locally, then inserting the destination number and G-SMSC address into a Message Waiting Data (MWD) table;
when receiving a notification message which indicates recovery of destination phone status sent by the C-MSC, according to the destination number carried in the notification message, the interworking SMSC searching the MWD table and obtaining the G-SMSC address corresponding to the destination number, then sending a notification to the G-SMSC, and deleting the destination number and the G-SMSC address in the MWD table;
after receiving the notification, the G-SMSC regenerating a MT-SMS procedure.

5. The method according to claim 1, further comprising following steps:
if the step of according to G-MSC address, carried in the SRI response, of the home network of the destination number, the interworking SMSC originating a MT-SMS to G-MSC corresponding to the G-MSC address fails, the interworking SMSC sending a RDS request carrying the destination number to the G-HLR;
the G-HLR sending a RDS response to the interworking SMSC, wherein the RDS response carries SMSC address, searched according to the destination number, of network to which the destination number belongs;
after receiving a notification message sent by the G-SMSC which indicates recovery of destination phone status in the GSM network, the interworking SMSC performing message retry and re-originating the MT-SMS to the SMSC in the network to which the destination number belongs, and replying a notification response message to the G-HLR.

6. A system for inter-network SMS interworking in NP service, comprising: a SMSC in a first GSM network (G1-SMSC), a Number Portability Data Base (NPDB) of a CDMA network, a HLR of a second GSM network (G2-HLR) and an interworking SMSC; wherein
the G1-SMSC is configured to: when judging a destination user is not a user of local network, deliver a SRI message carrying a destination MDN to the interworking SMSC; after receiving a SRI response, originate a MT-SMS to MSC where the destination user is located according to address information of the MSC where the destination user is located carried in the SRI response;
the interworking SMSC is configured to: query the NPDB for a home network of the destination MDN according to the destination MDN, and when judging that the home network is a second GSM network, send the SRI message carrying the destination MDN to the G2-HLR, wherein a source address of the SRI message is an address of the G1-SMSC;
the NPDB is configured to provide service of the home network of the destination MDN for the interworking SMSC;
the G2-HLR is configured to send a SRI response, carrying the address information of the MSC where the destination user is located, to the G1-SMSC after receiving the SRI message;
or, the system comprising:
a SMSC in a GSM network (G-SMSC), a Number Portability Data Base (NPDB) in a CDMA network, a HLR in a CDMA network (C-HLR) and an interworking SMSC;
the G-SMSC is configured to: when judging that a destination user is not a user of local network before delivery of MT-SMS, deliver a SRI message carrying a destination number to the interworking SMSC; deliver the MT-SMS carrying the destination number to the interworking SMSC; and receive a MT-SMS response returned by the interworking SMSC;
the interworking SMSC is configured to query the NPDB for a home network of the destination number, and if judging that the home network of the destination number is a CDMA network, convert the SRI message into a Send-Routing-Info request of the CDMA network and deliver to the C-HLR; after receiving a Send-Routing-Info response, save a corresponding relationship between the destination number and a C-MSC address, which is carried in the response, of the home network of the destination number, and convert the Send-Routing-Info response into a SRI response then return to the G-SMSC, wherein a source address in the SRI response is an address of the interworking SMSC in the GSM network; and according to the corresponding relationship between the destination number and the C-MSC address locally stored, convert the MT-SMS into a MT-SMS of the CDMA network and deliver to the C-MSC corresponding to the destination number after receiving the MT-SMS, and after receiving a MT-SMS response returned by the C-MSC, convert the MT-SMS response into a MT-SMS response of the GSM network and deliver to the G-SMSC;
the NPDB is configured to provide service of the home network of the destination number for the interworking SMSC;
the C-HLR is configured to after receiving the Send-Routing-Info request, search and obtain address information of the C-MSC according to the destination number carried in the Send-Routing-Info request, and return the searched-out address information to the interworking SMSC by the Send-Routing-Info response;
or the system comprising:
a SMSC in a GSM network (G-SMSC), a NPDB in a CDMA network, a HLR in a GSM network (G-HLR), a SMSC in a CDMA network (C-MSC) and an interworking SMSC;
the C-MSC is configured to send a SMDPP mobile originated request carrying a destination number to the interworking SMSC;

the interworking SMSC is configured to: after receiving the SMDPP mobile originated request, query the NPDB for a home network of the destination number according to the destination number carried in the SMDPP mobile originated request; and when judging that the home network of searched-out destination number is a GSM network, send a Send-Routing-Info request carrying the destination number to the G-HLR; and after receiving a Send-Routing-Info response returned by the G-HLR, according to G-MSC address, which is carried in the Send-Routing-Info response, of the home network of the destination number, initiate a MT-SMS to G-MSC corresponding to the G-MSC address;

the NPDB is configured to provide service of the home network of the destination MDN for the interworking SMSC;

the G-HLR is configured to, after the Send-Routing-Info request is received, search and obtain address information of the G-MSC according to the destination number carried in the Send-Routing-Info request, and return the searched-out address information to the interworking SMSC by the Send-Routing-Info response.

7. The system according to claim 6, wherein
the NPDB is configured to provide service of the home network of the destination MDN for the interworking SMSC by following ways: the NPDB returning Routing Number (RN) of the home network of the destination MDN to the interworking SMSC according to the destination MDN sent by the interworking SMSC;

the interworking SMSC is also configured to record a corresponding relationship between the RN and the destination MDN after obtaining the RN of the home network of the destination MDN;

after receiving the RDS request, according to the corresponding relationship between the RN and the destination MDN recorded locally, obtain the RN of a second GSM network, and originate a RDS request message to the G2-HLR, wherein a source address in the RDS request message is an address of G1-SMSC;

or to process a destination address of SCCP layer in the SRI message which is sent to the G2-HLR to be a form of $RN_{G2}$ corresponding to a second GSM network+destination MDN, wherein the $RN_{G2}$ denotes the RN of the second GSM network;

or to save a corresponding relationship between the destination number and the home network of the destination number;

after knowing that the destination number belongs to the CDMA network according to the corresponding relationship between the destination number and the home network of the destination number locally stored after receiving the RDS request message, insert the destination number and G-SMSC address into a Message Waiting Data (MWD) table; and when receiving a notification message of recovery of destination phone status sent by C-MSC, search the G-SMSC address corresponding to the destination number in the MWD table according to the destination number carried in the notification message, and then send the notification message to G-SMSC, and delete the destination number and G-SMSC address in the MWD table;

or to send a RDS request carrying the destination number to the G-HLR after initiating the MT-SMS to G-MSC fails; and after receiving a notification message indicating recovery of destination phone status in the GSM network sent by the G-MSC, perform message retry and re-originate the MT-SMS to SMSC in a network to which the destination number belongs, and reply a notification response message to the G-HLR;

the G1-SMSC is also configured to deliver a RDS request message carrying the destination MDN to the interworking SMSC after originating the MT-SMS fails;

the G-SMSC is also configured to deliver a RDS request message carrying the destination MDN to the interworking SMSC when the delivery of the MT-SMS fails; and restart a MT-SMS procedure after receiving a notification message sent by the interworking SMSC;

the C-MSC is configured to send the notification message to the interworking SMSC after the destination phone recovers the status;

the G-HLR is also configured to send a RDS response to the interworking SMSC and receive the notification response message sent by the interworking SMSC; wherein the RDS response carries a SMSC address, searched according to the destination number, of the network the destination number belongs to;

the G2-HLR is also configured to return a RDS response to the G1-SMSC after receiving the RDS request message.

8. The system according to claim 6, wherein the interworking SMSC comprises a service processing module, a G-MAP signaling processing module and a C-MAP signaling processing module; wherein
the service processing module is configured to realize triggering for each service logic, wherein the service logic includes a processing logic for NP service and for interworking service;

the G-MAP signaling processing module and C-MAP signaling processing module are configured in the interworking SMSC to implement signaling conversion between GSM and CDMA networks.

9. The system according to claim 8, wherein the interworking SMSC further comprises a charging processing module; wherein
the charging processing module connects with the service processing module, and is configured to generate a accounting bill according to obtained service processing information.

* * * * *